Sept. 13, 1938.  J. G. TYKEN  2,129,891
CLUTCH FOR POWER TRANSMITTING DEVICES
Filed July 27, 1936  2 Sheets-Sheet 1
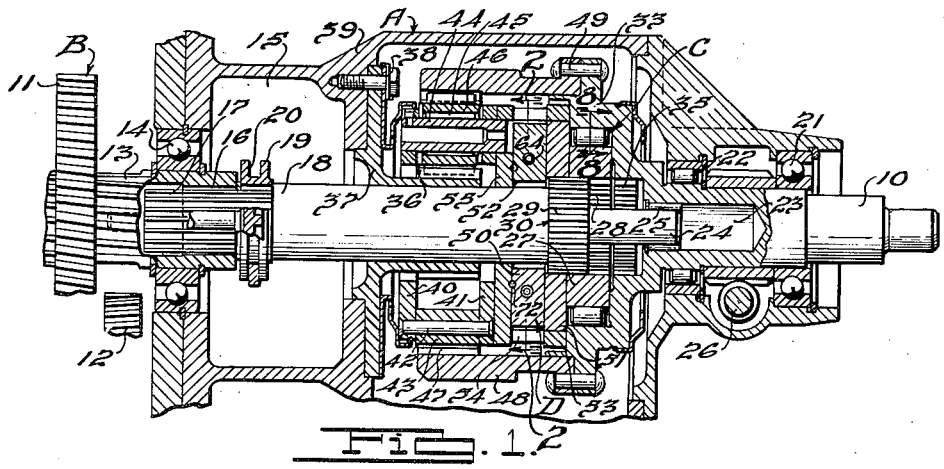
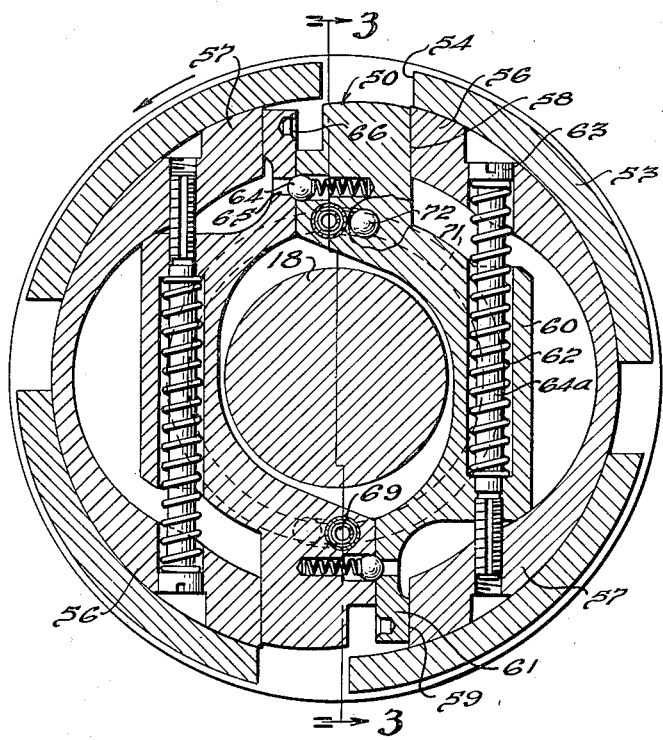 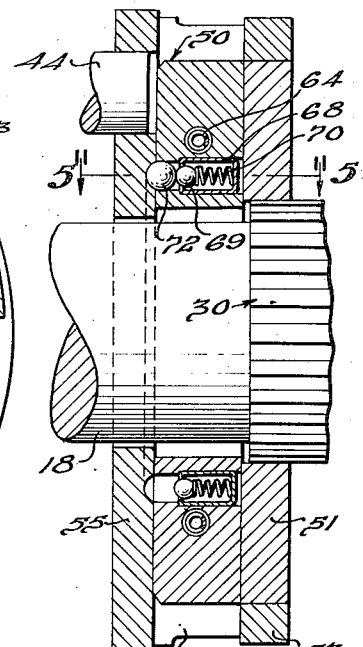
INVENTOR
John G. Tyken.
BY
Harness, Dind, Patee & Harris
ATTORNEYS.

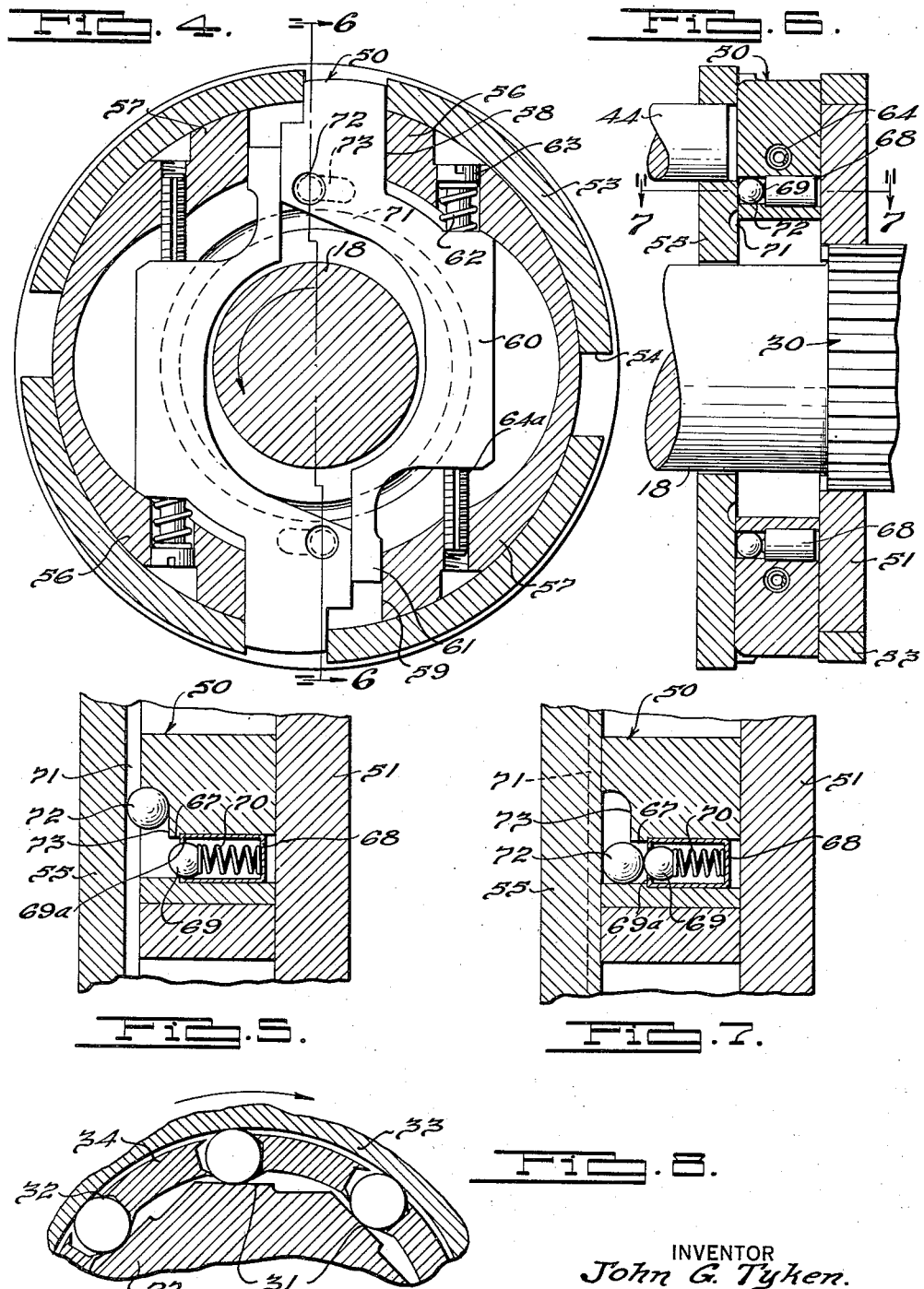

Patented Sept. 13, 1938

2,129,891

UNITED STATES PATENT OFFICE 2,129,891

CLUTCH FOR POWER TRANSMITTING DEVICES

John G. Tyken, Detroit, Mich., assignor to Chrysler Corporation, Highland Park, Mich., a corporation of Delaware Application July 27, 1936, Serial No. 92,769

9 Claims. (Cl. 192—105)

This invention relates to power driving mechanisms especially adapted for use in driving motor vehicles and refers more particularly to improvements in clutch control means for such driving mechanisms. More specifically, I have provided improvements in automatically operating clutches of the centrifugal force operated type in which a centrifugally operating clutching element is moved for positive engagement with a companion clutching element when the speeds of these clutching elements are substantially synchronized.

One object of my invention resides in the provision of an improved clutch control means for controlling power driving mechanisms which are adapted under predetermined conditions to automatically effect the drive for the vehicle. My clutch controlling means is preferably adapted for use in connection with either, or both, a speed ratio changing transmission of any desired type, or an auxiliary—preferably automatically operating—driving speed ratio for the vehicle, such as an overdrive ratio for example.

Another object of my invention is to provide an automatic overdrive mechanism between driving and driven shafts incorporating clutching means and latching means for controlling the operation of the clutching means.

To effect the operation of the aforesaid automatic overdrive mechanism, with which I prefer to illustrate my clutch controlling means, an automatically operaitng clutch of the centrifugal force operated type has been provided in which one or more centrifugally operated clutching pawls or elements forming one of the clutching structures is moved for positive engagement with a companion clutching structure when the speeds of these clutching structures are substantially synchronized.

This clutch controlling means is so arranged in the embodiment shown that operation of the centrifugal element is prevented until the speeds of the clutching structures are substantially synchronized. This control is preferably so constructed as to prevent movement of the centrifugal element when the driven shaft is being driven directly or in some manner other than through the overdrive, even though the centrifugal element is subjected to conditions otherwise tending to effect its movement toward clutching engagement. Such arrangement prevents undesired wear of the clutching means and noises incident to the "ratcheting" effect of certain types of clutching means and has other advantages which will presently be more apparent.

This controlling means, according to the preferred embodiment of my invention, consists of a novel latching means so arranged as to control the clutching means for the speed ratio drive, insuring against their improper operations, protecting the parts of the mechanism against undue wear and destructive influences, and simplifying the mechanism as a whole and the operation thereof.

Further objects and advantages of my invention will be more apparent from the following detailed description of several illustrative embodiments of my invention, reference being had to the accompanying drawings in which:

Fig. 1 is a sectional elevational view of an overdriving mechanism incorporating my clutch controlling means.

Fig. 2 is a transverse sectional elevational view through the automatic clutch illustrated in the disengaged condition, the section being taken as indicated by the line 2—2 of Fig. 1.

Fig. 3 is a sectional view through the clutch shown in Fig. 2, the section being taken as indicated by the line 3—3 of Fig. 2.

Fig. 4 is a sectional elevational view corresponding to Fig. 2, the automatic clutch being shown in its engaged condition.

Fig. 5 is an enlarged fragmentary sectional view showing the details of my clutch controlling device when the automatic clutch is in disengaged condiiton, the section being taken approximately as indicated by line 5—5 of Fig. 3.

Fig. 6 is a sectional view of the clutch shown in Fig. 4 in engaged condition, the section being taken as indicated by line 6—6 of Fig. 4.

Fig. 7 is an enlarged fragmentary sectional view showing the details of my clutch controlling device when the automatic clutch is in the engaged condition, the section being taken approximately as indicated by the line 7—7 of Fig. 6.

Fig. 8 is a sectional elevational view through a portion of the overrunning or free wheeling clutch, the section being taken as indicated by line 8—8 of Fig. 1.

With reference to the drawings, I have illustrated my driving mechanism A interposed between a speed ratio changing transmission B and the driven shaft 10, the latter extending rearwardly to driven the rear wheels (not shown) of the motor car or vehicle in the usual well-known manner, it being understood that I have elected to show my invention in association with a motor vehicle drive although my invention in its broader aspects is not necessarily limited thereto.

The transmission B may be of any suitable type such as the conventional selector type operated in the well-known manner through usual selector controls whereby the various adjustments may be made to the transmission to provide the speed ratios in the line of drive through the transmission.

Inasmuch as transmission B may for the most part be of general conventional construction and operation, I have shown in Fig. 1 only a portion of the gearing of this transmission, wherein 11 represents the gear adapted to be shifted by the usual reverse selector control (not shown) rearwardly or to the right for engagement with the usual reverse idler gear 12 to effect a reverse drive from the normal direction of drive to the driven shaft 10.

The power coming from the usual engine or other prime mover (not shown) which may be located forwardly of transmission B, drives the transmission and the power is taken from this transmission by a power driving means or shaft 13 rotatable in a bearing 14, the shaft having a portion extending rearwardly into the shifting space 15 of the driving mechanism A. This rearwardly extending portion of shaft 13 is provided with a rearwardly opening splined bore 16 adapted to receive the forwardly extending splined end 17 of the shiftable driving shaft 18, shafts 13 and 18 at all times rotating together by reason of the engaging splines 16 and 17. The driving shaft 18 carries a collar 19 having an annular groove 20, this collar being adapted to axially shift the shaft 18 with respect to the shaft 13 as will be more particularly hereinafter apparent.

The driven shaft 10 extends forwardly in bearings 21, 22 and is provided with a forwardly extending bore 23 slidably piloting the rearwardly extending reduced end 24 of shaft 18, a bearing 25 being provided between the bore 23 and the end portion 24. The usual speedometer take-off drive is illustrated at 26.

An overrunning or free wheeling clutch C, best shown in Figs. 1 and 8, is incorporated in the driving mechanism A as a part of the primary driving means between driving shafts 13 and 18 and driven shaft 10. The inner cam member 27 is driven by internal splines 28 engaged by the splines 29 of a clutch gear 30 formed as a part of the driving shaft 18. The inner cam member 27 has cam faces 31 engaged by cylinders 32 so that by the driving rotation of shaft 18, the high sides of cam faces 31 will wedge the cylinders 32 between cam member 27 and the outer cylindrical driven member 33 of the overrunning clutch to establish a direct drive thereto. The usual spacers 34 maintain the cylinders 32 in spaced position, and since the driven free wheeling part 33 is a forward extension of driven shaft 10 as shown in Fig. 1, it will be apparent that whenever the engine or driving shaft 13 slows down, the vehicle and driven shaft 10 may, by reason of the clutch C overrun the driving shaft, other conditions permitting such action as will be presently apparent.

Intermediate the driven member 33 of the free wheeling clutch C and the bearing 25, the driven shaft 18 is provided with an annular series of internal splined teeth or jaws 35 complementary to the splines 29 of the shiftable clutch gear 30, the splines 35 and 29 being adapted to interengage when the shaft 18 is shifted rearwardly.

While various types of gearing for the speed ratio or overdrive may be employed, I have elected to illustrate planetary gearing comprising a sun gear 36 fixed by a bracket 37 and fasteners 38 to the casing 39 of the overdrive mechanism A, the shaft 18 freely rotating within this sun gear. A planet carrier is provided with axially spaced rings 40, 41 connected at circumferentially spaced intervals by the tie members 42, the planetary carrier rings 40, 41 being maintained in spaced relationship by sleeves 43 respectively carried by the tie members 42.

Spaced circumferentially between the tie members 42 are the planet gear shafts 44 supported by the rings 40, 41 and journalled by a bearing 45 on each of the shafts is a planetary gear pinion 46 meshing with the aforesaid sun gear 36. The planetary gears 46 also mesh with an internal gear 47 carried by a sleeve 48 which projects forwardly from the outer member 33 of the free wheeling clutch C. The sleeve 48 is rigidly connected to member 33 by fasteners 49, the sleeve 48 having its axis concentric with the axis of shaft 10.

An automatic clutch D has its centrifugally actuated clutching elements or pawls 50 carried by a pawl cage 51 which has an annular series of internal teeth or splines 52 illustrated in Fig. 1 as being interengaged by the splines 29 of the shiftable clutch gear 30.

The companion cooperating clutch member of the automatic clutch D is provided by a cylindrical clutching structure or shell 53 having an annular series of spaced pawl receiving slots or openings 54, the shell 53 having an inwardly extending forwardly located plate or flange 55 receiving the rearwardly extending ends of the planetary gear shafts 44 whereby the shell 53 is driven by the planetary gears 46. The flange 55 thus forms a portion of the slotted clutching structure and is rotated with the planetary carrier parts 40, 41.

The pawl cage 51 of the clutch D, best shown in Figs. 2 and 4, is provided with diametrically arranged pairs of lateral extensions or pawl guides 57 and 56. Extensions 56 have pawl engaging faces 58 and extensions 57 have similar bearing faces 59. Fitting within shell 53 are a pair of the said pawls 50, each having a face in sliding engagement with a face 58 of extension 56 and each extending generally inwardly of the pawl carrying cage. Thus, each pawl is formed with a yoke portion 60 normally seated on an extension 57, each yoke portion having a guide counterbalancing portion 61 slidable intermediate a face 59 and the sides of the other pawl opposite the sides thereof in engagement with the face 58. In order to normally urge the pawls 50 inwardly of the pawl cage 51 to position the parts as shown in Fig. 2, springs 62 are provided, each spring acting on the head 63 of a screw bolt 64ª threadedly engaging suitable openings in extensions 57, the yoke portions 60 being also provided with suitable openings so as to slidably receive the respective bolts 64ª and springs 62 cooperating therewith.

When pawls 50 move outwardly into slots 54, such movement is limited by engagement of yoke portions 60 with extensions 56, the yoke portions sliding on bolts 64ª.

Each pawl 50 may be provided with a spring actuated ball dent 64 releasably engaging either of recesses 65 or 66 to assist in holding the pawls in stabilized condition, to prevent hunting prior to their release for outward and inward clutching movement respectively, and to govern the clutching characteristics.

Preferably each pawl 50 is provided, in accordance with the illustrated embodiment of my invention, with a ball detent operating within a recess 67 in the pawls at right angles to flange 55. The ball detent preferably consists of a casing 68 secured within the recess 67 and suitably housing a movable ball 69 having a yielding means acting thereon which may be a spring 70 to normally maintain a desired portion of the ball 69 protruding through an opening 69a in the casing 68 nearest the flange 55. An annular groove 71 is provided on the rearward face of flange 55 to partially receive therein the balls 72 each of which moves to the extreme end of a shorter cooperating groove, or detent ball-receiving pocket, 73 which extends circumferentially of the axis of rotation of the pawl cage 51 and in registration with the annular groove 71 prior to clutching movement of the pawls 50, as shown in Figs. 2, 3 and 5. This pocket 73 has a second portion, or recess, 67 extending axially of said axis. Each ball 72 is maintained in this extreme position by the friction and relatively slower rotation of flange 55 with respect to the rotation of the pawls, while the mechanism A is in normal direct-drive condition, as will hereinafter be more apparent. When the rotational speed of the pawls and driving shaft 18 slows down for the synchronizing action of the clutching structures, the ball 72 is moved to its other position opposite the detent ball 69.

In the operation of the driving mechanism A and my automatic clutch control, according to the aforesaid illustrated embodiment thereof, the position of the parts in Figs. 1, 2, 3, 5 and 8 is the normal driving condition of the vehicle wherein the overdrive may take place. Thus the drive coming from the engine and thence through transmission B, passes from transmission driving shaft 13 to the driving shaft 18, the drive then being transmitted through clutch gear 30 to the free wheeling cam 27, through the free wheeling clutch C and thence to the outer free wheeling member 33 and driven shaft 10 to the vehicle driving ground wheels. Under such conditions, the motor vehicle will be directly driven between driving and driven shafts 13 and 10, respectively, the driven shaft 10 overrunning the driving shaft 13 whenever the engine and driving shaft are slowed down below the speed which is required to establish a drive to the motor vehicle.

When the speed of driving shaft 18 is below the critical speed necessary for clutching engagement of pawls 50 with slots 54, the position of the automatic clutch parts being illustrated in Figs. 1, 2 and 3, each ball 72 will be carried in its groove 73 to its extreme position of Figs. 2, 3 and 5 by friction and slower relative rotation of the groove 71 of flange 55 in the same direction.

Let it now be presumed that the motor vehicle is further accelerated under power from the engine to rotate the driving shafts 13 and 18 in said direct one-way drive above the critical speed of the pawls 50, the pawls will be prevented from moving toward clutching engagement with the slower moving slots 54 by the balls 72 being maintained in the position of Figs. 2, 3 and 5. The clutching movement of pawls 50 under those conditions will be prevented by the interlocking of the balls 72 between the grooves 71 and 73.

Now let it be presumed that the operator of the motor vehicle desires to effect engagement of the automatic clutch D to drive the motor vehicle with the overdrive in operation. The driver will then diminish or release the power from the engine by withdrawing his foot from the usual accelerator pedal and the speed of the engine will thus rapidly decelerate although, by reason of the overrunning clutch C the motor vehicle will continue to travel above the aforesaid critical speed, it being presumed for the moment that the motor vehicle is traveling on a level roadway without decelerating or retarding influences.

As the engine decelerates, the pawls 50 will likewise decelerate, the pawls smoothly passing within the shell 53 and beyond the successive slots 54 until the engine has decelerated to substantially the continuing speed of the shell. The shell 53 and cage 51 are thus substantially synchronized, the pawls 50 being urged outwardly under centrifugal force but being held against movement and the engine continuing to decelerate until the R. P. M. of the pawl cage is just less than that of the shell 53 so that the shell now begins to very slowly rotate in the same direction relatively faster than the pawls for a fraction of a revolution beyond exact synchronism. Under this condition each ball 72 will be moved to its other position opposite detent ball 69, whereupon the pawls 50 will be projected toward complete clutching engagement with slots 54, as in Figs. 4, 6 and 7.

As the rotational speed of the driving shaft 18 diminishes during the overrunning action, the driving shaft speed as well as that of the pawls 50 will ordinarily fall below that of the slotted shell 53 for a maximum rotation of one-quarter of a complete revolution of the pawl cage, during which time the detent balls 72 are moved from their Fig. 5 positions to their Fig. 7 positions, and during which time the pawls will be projected outwardly to clutchingly engage the next approaching slot. I have illustrated these slots 54 as being spaced 90°, although it will be apparent that additional slots may be provided, if desired, and to thereby reduce the relative rotation below synchronism for the clutching engagement.

However, with the slots 54 arranged as illustrated, the centrifugal clutch D will engage substantially during synchronism of the clutching structures and without any perceptible shock to the driving mechanism or the occupants of the motor vehicle. It will furthermore be understood that the relationship of the pawls 50 with the springs 62 is such that the pawls will be urged outwardly at the desired motor vehicle speed notwithstanding the reduction in the driving shaft speed relative to that of the driven shaft during the overrunning action preparatory to synchronizing the clutching structures for effecting their engagement.

Upon movement of the pawls 50 toward clutching engagement and during such engagement with slots 54, each ball 72 is maintained in the Fig. 7 position from which it is apparent that these balls cannot enter the grooves 73.

The motor vehicle is now in the two-way overdriving condition, the driven shaft 10 being driven through the auxiliary planetary gearing and the clutch C providing the necessary overrunning between the outer and inner clutch parts by reason of the difference in speeds of these parts. Thus, the drive passes from driving shafts 13 and 18 through clutch gear 30, pawl cage 51 to the pawls and thence to the shell 53. From the shell 53 the drive passes to the planetary gears 46, these gears serving to rotate the sleeve 48 and driven shaft 10 at a speed greater than that of driving shafts 13 and 18 by the amount of overdrive ratio afforded by the auxiliary gearing.

The automatic clutch D will remain in engagement until the motor vehicle is decelerated below the critical speed, whereupon the primary springs 62 will tend to urge the pawls 50 inwardly. Upon release of the usual accelerator to relieve the driving friction at the pawls and slots, the pawls, being retained from hunting by the detent ball 64 acting in recess 66, will move inwardly to their position of Figs. 1, 2, 3 and 4. Upon the inward movement of pawls 50, each ball 72 of my control means will snap into the groove 71 and will again be carried to its extreme position of Figs. 2, 3 and 5 when the vehicle is again accelerated to restore the drive through the overrunning clutch C. It will be understood that a single assembly of a pawl 50 and detent ball 72 may be provided, if desired.

In the foregoing description of the operation of the driving mechanism, it has been presumed that the parts were positioned as shown in Fig. 1, reference being made particularly to the position of shifting clutch gear 30 which has been presumed to have remained in driving engagement with the pawl cage 51 and the free wheeling cam 27. When suitable means are provided for shifting the collar 19 rearwardly in response to the vehicle being driven in reverse or in response to a suitable remote control for the driver, the shifting clutch gear 30 is moved as aforesaid to connect shaft 18 directly to the driven shaft 10 by reason of engagement of splines 29 and 35, while maintaining the connection with cam 27. Thus the overrunning clutch C is rendered ineffective and a two-way drive established between shafts 18 and 10.

While I have illustrated the ball detents 72 as frictionally engaging the flange 55 of the clutching structure carrying slots 54, it will be apparent that the operation of the ball detents will not be changed in the event that they engage any other surface which is rotatable in unison with the slotted clutching structure. It is with this in mind that I have referred to the ball detents co-operating or engaging with the clutching structures throughout my foregoing description and claims appended hereto.

Although I have illustrated my invention in connection with an overdrive mechanism for motor vehicles, I desire to point out that this is but one useful application or use of my improved automatic clutch. My improvements may be used to advantage whenever clutching action between two rotatable parts is desired, particularly where such action is to be automatically responsive to desired conditions of relative rotatable speeds of the two members to be clutched or declutched.

I furthermore do not limit my invention, in the broader aspects thereof, to any particular combination and arrangement of parts such as shown and described for illustrative purposes since various modifications will be apparent from the teachings of my invention and scope thereof as defined in the appended claims.

What I claim is:

1. In a centrifugal clutch for drivingly connecting driving and driven shafts, clutching structures respectively drivingly connected to said shafts for relative rotation at relatively different predetermined speeds, one of said clutching structures including a clutching element adapted for centrifugal force movement to clutchingly engage the other when the speeds thereof are approximately synchronized, one of said clutching structures having an annular groove formed therein, a detent ball carried by said clutching element and engaging in said groove to prevent centrifugal force movement of said clutching element during said relative rotation of said clutching structures, said clutching element having a recess adapted to receive said detent ball in response to variation in said relative rotation of said clutching structures to permit centrifugal force movement of said clutching element.

2. In a centrifugal clutch for drivingly connecting driving and driven co-axial shafts, clutching structures respectively drivingly connected to said shafts for relative rotation about the axis of said shafts at relatively different predetermined speeds, one of said clutching structures comprising a pawl adapted for centrifugal force movement to clutchingly engage the other when the speeds thereof are approximately synchronized, one of said clutching structures having an annular groove formed therein, said pawl having a pocket having a portion thereof extending therein in the direction of said axis and a second portion extending circumferentially of said axis, a detent ball movable in said pocket and engaging said groove, said relative rotation of said clutching structures being such that said grooved clutching structure urges said ball into said second pocket portion to prevent centrifugal force movement of said pawl, said grooved clutching structure acting to move said ball into the first said pocket portion in response to variations in said relative rotation of said clutching structures to release said pawl for centrifugal force movement thereof.

3. In a centrifugal clutch for drivingly connecting driving and driven coaxial shafts, clutching structures respectively drivingly connected to said shafts for relative rotation about the axis of said shafts at relatively different predetermined speeds, one of said clutching structures comprising a pawl adapted for centrifugal force movement to clutchingly engage the other when the speeds thereof are approximately synchronized, one of said clutching structures having an annular groove formed therein, said pawl having a pocket having a portion thereof extending therein in the direction of said axis and a second portion extending circumferentially of said axis, a detent ball movable in said pocket and engaging said groove, said relative rotation of said clutching structures being such that said grooved clutching structure urges said ball into said second pocket portion to prevent centrifugal force movement of said pawl, said grooved clutching structure acting to move said ball into the first said pocket portion in response to variation in said relative rotation of said clutching structures to release said pawl for centrifugal force movement thereof, and yielding means carried by said pawl and acting to urge said ball toward said grooved clutching structure when said ball is in the first said pocket portion.

4. In a centrifugal clutch of the character described, relatively rotatable co-axial clutching structures, one of said structures having a pawl-receiving slot formed therein and an annular groove, the other of said structures comprising a centrifugal force operated pawl adapted to engage said slot when the speeds of said structures are approximately synchronized, said pawl having a pocket registering with said groove prior to clutching movement of said pawl, and a detent ball carried by said pawl in said pocket, said ball engaging said groove for holding said pawl against clutching movement, said pocket having a portion thereof adapted to receive said ball in response to variation in the relative speeds of said clutching structures for releasing said pawl for centrifugal force movement thereof.

5. In a centrifugal clutch of the character described, relatively rotatable co-axial clutching structures, one of said structures having a pawl-receiving slot formed therein and an annular groove, the other of said structures comprising a centrifugal force operated pawl adapted to engage said slot when the speeds of said structures are approximately synchronized, said pawl having a pocket registering with said groove prior to clutching movement of said pawl, a detent ball carried by said pawl in said pocket, said ball engaging said groove for holding said pawl against clutching movement, said pocket having a portion thereof adapted to receive said ball in response to variation in the relative speeds of said clutching structures for releasing said pawl for centrifugal force movement thereof, and yielding means carried by said pawl and acting to urge said ball toward said grooved clutching structure when said ball is in said pocket portion.

6. In a centrifugal clutch of the character described, relatively rotatable co-axial clutching structures, one having a pawl-receiving slot formed therein and the other being adapted for centrifugal force movement to engage said slot when the speeds of said structures are approximately synchronized, one of said structures having an annular groove, the other of said structures having a pocket adapted to register with said groove prior to clutching movement of said pawl, and a ball detent movable in said pocket and groove for holding said pawl against clutching movement, said pocket having an enlarged portion thereof adapted to receive said ball in response to variation in the relative speeds of said clutching structures for releasing said pawl for centrifugal force movement thereof.

7. In a centrifugal clutch of the character described, relatively rotatable co-axial clutching structures, one having a pawl-receiving slot formed therein and the other being adapted for centrifugal force movement to engage said slot when the speeds of said structures are approximately synchronized, one of said structures having an annular groove, the other of said structures having a pocket adapted to register with said groove prior to clutching movement of said pawl, a ball detent movable in said pocket and groove for holding said pawl against clutching movement, said pocket having an enlarged portion thereof adapted to receive said ball in response to variations in the relative speeds of said clutching structures for releasing said pawl for centrifugal force movement thereof, and yielding means acting to urge said ball toward said grooved clutching structure when said ball is in said enlarged pocket portion.

8. In a centrifugal clutch for drivingly connecting driving and driven shafts, clutching structures respectively drivingly connected to said shafts for relative rotation at relatively different predetermined speeds, one of said clutching structures including a clutching element carried thereby and adapted for centrifugal force projection in response to rotation thereof at or above a predetermined clutching speed, the other of said clutching structures having a slot accommodating positive clutching engagement by said centrifugal clutching element, said clutching structures being so constructed and arranged as to limit clutching thereof to approximate synchronized rotation thereof, said clutching element being fixed against movement axially with respect to said clutching structures, means yieldingly acting to oppose projection of said centrifugal clutching element and to return said element from its clutched position to a retracted declutched position thereof in response to predetermined drop in the rotational speeds of said clutching structures, and control means acting to prevent said projection of said centrifugal clutching element when said element is rotated at a speed greater than said predetermined clutching speed and when said clutching structures are rotated at said relatively different predetermined speeds, said control means including a latch member supported for movements axially and rotationally with respect to one of said clutching structures, said latch member acting to release said centrifugal clutching element for said projection thereof in response to predetermined drop in the rotational speed of one of said clutching structures relatively to that of the other of said clutching structures from a condition of rotation of said clutching structures at said relatively different predetermined speeds.

9. In a centrifugal clutch for drivingly connecting driving and driven shafts, clutching structures respectively drivingly connected to said shafts for relative rotation at relatively different predetermined speeds, one of said clutching structures including a clutching element adapted for centrifugal force projection in response to rotation thereof at or above a predetermined clutching speed, the other of said clutching structures having means accommodating positive clutching engagement by said centrifugal clutching element, said clutching structures being so constructed and arranged as to limit clutching thereof to approximate synchronized rotation thereof, means yieldingly acting to oppose projection of said centrifugal clutch element and to return said element from its clutched position to a retracted declutched position thereof in response to predetermined drop in the rotational speeds of said clutching structures, said clutching structures having recesses registered with each other only when said centrifugal clutching element is retracted, a detent ball disposed in said registered recesses to prevent said projection of said centrifugal clutching element when said element is rotated at a speed greater than said predetermined clutching speed and when said clutching structures are rotated at said relatively different predetermined speeds, one of said recesses accommodating movement of said detent ball therein out of registry with the other in response to predetermined reduction of the rotational speed of one of said clutching structures to release said centrifugal clutching element for said clutching projection thereof.

JOHN G. TYKEN.